United States Patent [19]
Gemmell et al.

[11] Patent Number: 5,878,381
[45] Date of Patent: *Mar. 2, 1999

[54] SYSTEM AND METHOD FOR COLLECTING DATA ON TISSUE CONSUMPTION

[75] Inventors: Bruce M. Gemmell, Wilmington, Del.; Alan D. Frazier, West Chester, Pa.; Wesley James McConnell, Glen Mills, Pa.

[73] Assignee: Kimberly-Clark Wordwide, Inc., Neenah, Wis.

[*] Notice: The term of this patent shall not extend beyond the expiration date of Pat. No. 5,691,919.

[21] Appl. No.: 932,041

[22] Filed: Sep. 17, 1997

Related U.S. Application Data

[63] Continuation of Ser. No. 395,771, Feb. 28, 1995, Pat. No. 5,691,919.

[51] Int. Cl.⁶ .......................................................... G01B 5/04
[52] U.S. Cl. ............................ 702/163; 702/187; 33/735; 33/737; 242/563; 242/563.2; 340/541; 340/573; 340/675
[58] Field of Search ........................... 33/1 PT, 733, 33/734, 735, 737, 743; 364/550, 560, 561, 562; 340/540, 541, 555, 556, 573, 675; 242/563, 563.2; 702/163, 187

[56] References Cited

U.S. PATENT DOCUMENTS

| | | | |
|---|---|---|---|
| 3,058,223 | 10/1962 | Schmidt et al. | 33/743 |
| 3,167,865 | 2/1965 | Steinberg | 33/127 |
| 4,097,726 | 6/1978 | Satch et al. | 242/563.2 |
| 4,151,403 | 4/1979 | Woolston | 235/92 DN |
| 4,335,439 | 6/1982 | St. Denis | 364/562 |
| 4,456,193 | 6/1984 | Westover | 242/563.2 |
| 4,475,163 | 10/1984 | Chandler et al. | 364/562 |
| 4,535,949 | 8/1985 | Olsson | 364/562 |
| 4,570,348 | 2/1986 | Amsler et al. | 33/734 |
| 4,704,798 | 11/1987 | Hird | 33/1 PT |
| 4,721,265 | 1/1988 | Hawkins | 242/563 |
| 4,767,922 | 8/1988 | Stauffer | 340/556 |
| 4,835,698 | 5/1989 | Beery et al. | 364/562 |
| 4,994,722 | 2/1991 | Dolan et al. | 340/555 |
| 5,031,528 | 7/1991 | Shaw | 242/563 |
| 5,050,093 | 9/1991 | Reddy el al. | 364/562 |
| 5,153,560 | 10/1992 | Ichikawa | 340/541 |
| 5,155,474 | 10/1992 | Park et al. | 340/541 |
| 5,250,941 | 10/1993 | McGregor et al. | 340/825.65 |
| 5,257,462 | 11/1993 | Buttermann | 33/733 |
| 5,280,274 | 1/1994 | Uemura et al. | 340/675 |
| 5,691,919 | 11/1997 | Gemmell et al. | 365/550 |

*Primary Examiner*—Eric W. Stamber
*Attorney, Agent, or Firm*—James E. Ruland

[57] ABSTRACT

A system and method for collecting data on individual and aggregate use of toilet tissue or other types of rolled absorbent paper in a public washroom includes a sensing system for sensing one or more characteristics of paper use at a particular dispensing location, and a recording system for receiving and recording data from said sensing system, whereby paper use at the dispensing location can be monitored and studied. The system further analyzes the data to determine such things as the total amount of paper used, the duration of time over which paper is used, the number of discrete pulls on the paper taken by a user and the amount of paper taken by a user per discrete pull.

52 Claims, 3 Drawing Sheets

SYSTEM AND METHOD FOR COLLECTING DATA ON TISSUE CONSUMPTION

This application is a continuation of application Ser. No. 08/395,771 entitled "SYSTEM AND METHOD FOR COLLECTING DATA ON TISSUE CONSUMPTION" and filed in the U.S. Patent and Trademark Office on Feb. 28, 1995now U.S. Pat. No. 5,691,919. The entirety of this Application is hereby incorporated by reference.

BACKGROUND OF THE INVENTION

1. Field of the Invention

This invention relates broadly to the field of consumer absorbent paper products, which includes, among other products, toilet tissue and paper towels. More specifically, this invention involves an improved system and method for collecting data on individual and aggregate usage of an absorbent paper product in a manner that is not detectable to persons who are using the product.

2. Description of the Prior Art

A great deal of technical and market research is invested by manufacturers of high quality absorbent paper products, such as Scott Paper Company, in designing and manufacturing products that are consistent as possible with consumer needs and preferences.

Unfortunately, for reasons both cultural and logistical, consumer habit information for certain products such as toilet tissue has been notoriously difficult to obtain. For example, data relating to factors as the total amount of paper used, the duration of time over which paper is used, the number of discrete pulls on the paper taken by a user and the amount of paper taken by a user per discrete pull would be very helpful for both marketing and engineering purposes. However, there has heretofore been no efficient way of compiling such data.

When collecting this type of information, it is important that consumers not know their activities are being monitored, since this may change their behavior. In addition, some consumers might become apprehensive at the thought of being monitored in this manner.

It is clear there has existed a long and unfilled need for a system and method for obtaining information on consumer tissue preferences and habits that is accurate, efficient and substantially undetectable by consumers.

SUMMARY OF THE INVENTION

Accordingly, it is and object of the invention to provide a system and method for obtaining information on consumer tissue preferences and habits that is accurate, efficient and substantially undetectable by consumers.

In order to achieve the above and other objects of the invention, a system for collecting data on toilet tissue use at a particular location, includes, according to a first aspect of the invention, a sensor for sensing one or more characteristics of toilet tissue use at a particular dispensing location; and a recorder, in communication with the sensor, for receiving and recording data from the sensor, whereby toilet tissue use at the dispensing location can be monitored and studied.

According to a second aspect of the invention, a system for analyzing individual and aggregate usage of toilet tissue use at a particular toilet stall, includes a determining system for determining whether a person is present in a toilet stall; a sensor for sensing one or more characteristics of toilet tissue use at the toilet stall; an analyzer for analyzing data that is supplied by the sensor; and a recorder for recording data from at least one of the sensor and the analyzer, the determining system, the sensor the analyzer and the recorder being configured and positioned so as to be substantially undetectable to a user, whereby toilet tissue use at the toilet stall can be accurately monitored and studied.

According to a third aspect of the invention, a system for collecting data on the use of a roll form absorbent commercial paper product at a particular location includes a sensor for sensing one or more characteristics of paper use at a particular dispensing location; and a recorder, in communication with the sensor, for receiving and recording data from the sensor, whereby paper use at the dispensing location can be monitored and studied.

According to a fourth aspect of the invention, a method for collecting data relevant to an individual's use of an absorbent roll type paper product in a communal area includes steps of: (a) determining when a person enters an area that is adjacent to a paper product dispenser; (b) monitoring the person's use of the paper product in such a manner that the person is not aware of such monitoring; and (c) recording data obtained from the monitoring.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
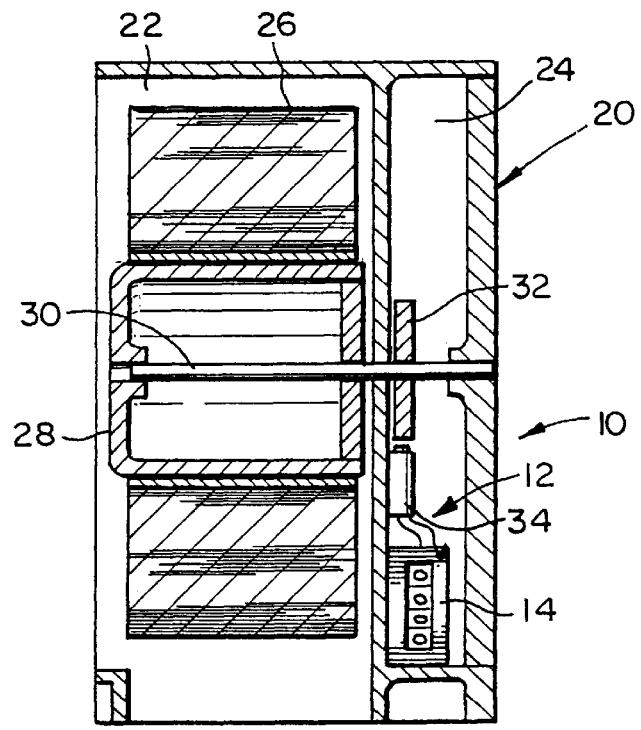
FIG. 1 is a cross sectional view of a system for collecting data on tissue consumption that is constructed according to a first, preferred embodiment of the invention.

Referring now to the drawings, wherein like reference numerals designate corresponding structure throughout the views, and referring in particular to FIG. 1, a system 10 for collecting data on toilet tissue use at a particular location includes a sensor 12 for sensing one or more characteristics of toilet tissue use at a particular dispensing location, and a control unit 14, which in the preferred embodiment analyzes and records data that is received from sensor 12. In the preferred embodiment, sensor 12 is constructed and arranged to sense quantitative characteristics of toilet tissue use, most preferably the amount of toilet tissue that is used by an individual or aggregate use at a location. As may be seen in FIG. 5, system 10 includes a CPU 18 for analyzing information from sensor 12, and a memory module 16 for storing the information and the products of the analysis.

Looking again to FIG. 1, it will be seen that system 10 includes a housing 20 having a first compartment 22 and a second compartment 24 defined therein. A roll 26 of toilet tissue is supported for rotation in the first compartment 22 of housing 20 on a spindle 28 that rotates together with an axis 30. Axis 30 extends into the second compartment 24 and is secured to a rotating member 32 that is constructed to rotate together with axis 30. Accordingly, rotating member 32 will rotate as a consumer pulls on the free end of the roll 26 of toilet tissue.

Figure 3:
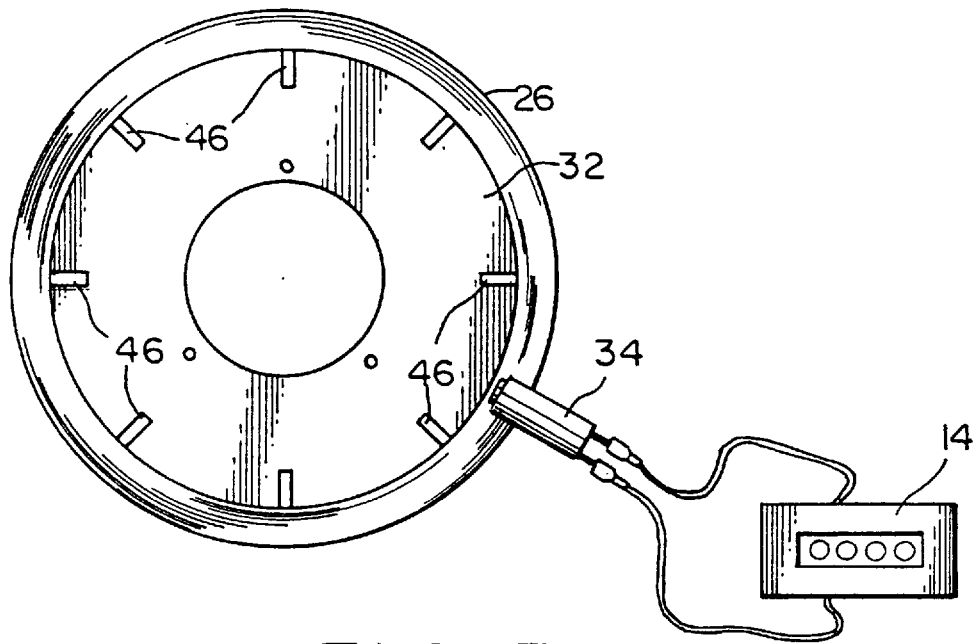
FIG. 3 is a diagrammatical view depicting one embodiment of a component in the system shown in FIGS. 1 and 2.

Sensor 12 includes, in the embodiment of FIG. 1, a magnetic movement detector 34 that senses rotational movement of member 32 in evenly spaced rotational increments, as may be seen in the diagrammatical view provided in FIG. 3. As shown in FIG. 3, rotating member 32 has a number of magnets 46 provided at even increments along the circumference thereof, which are detectable by magnet movement detector 34. These type of sensors are well known in the electromechanical arts.

Figure 2:
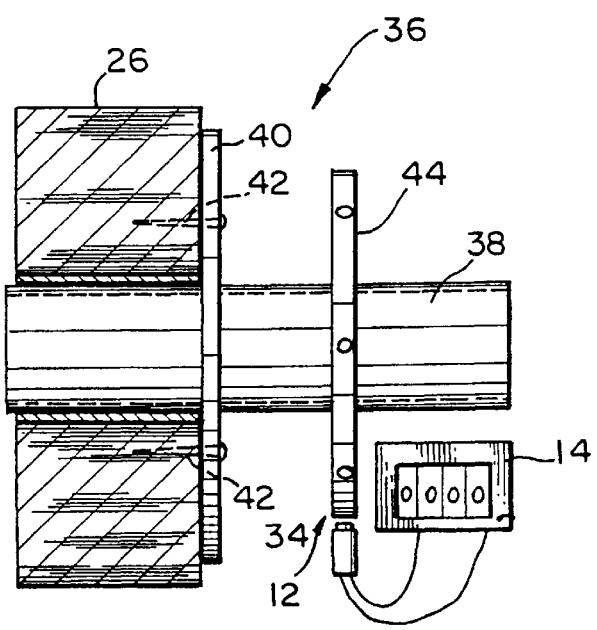
FIG. 2 is a cross sectional view depicting an alternative embodiment to that shown in FIG. 1.

FIG. 2 depicts a system 36 that is constructed according to a second embodiment of the invention. In system 36, a plate 40 is secured to the roll 26 of toilet tissue by a number of pins 42 that are inserted into the side of the roll 26. Plate 40 is secured to a spindle 38, which is in turn secured to a rotating member 44 that is substantially identical to the rotating member 32 described above. Rotational movement of member 44 is thus detected by a magnetic movement detector 34 in the manner described above with reference to FIGS. 1 and 3.

Figure 4:
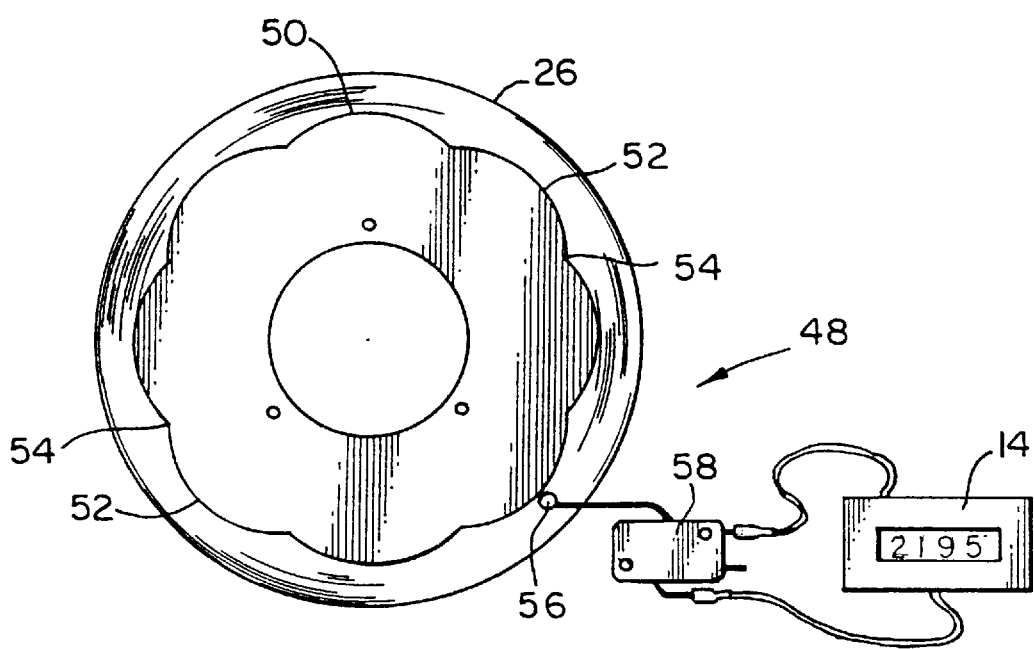
FIG. 4 is a diagrammatical view depicting an alternative version of the component depicted in FIG. 3.

FIG. 4 depicts a sensor 48 that is constructed according to an alternative embodiment of the invention. In this embodiment, a rotating member 50 is secured for rotation with the roll 26 of toilet tissue in either the manner described above with reference to FIG. 1, or that described with reference to FIG. 3. Rotating member 50 includes a number of cam riser portions 52 which alternate about the circumference of rotating member 50 with a corresponding member of cam troughs 54. A cam follower 56 is biased against rotating member 50 so as to actuate a mechanical switch 58 to a first position when positioned on one of the cam risers, and to a second, opposite condition when positioned on one of the cam troughs 54. In this way, the angular position of rotating member 50 is indicated to control unit 14, much in the manner described above with reference to FIG. 3.

Figure 5:
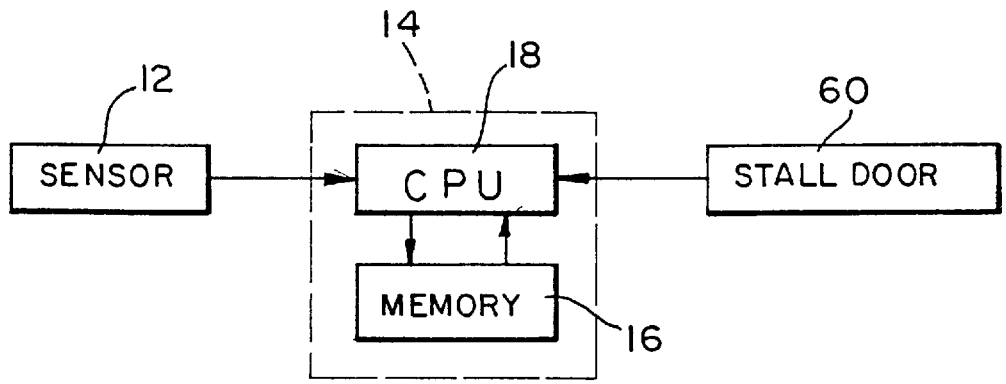
FIG. 5 is a schematic diagram of an overall system that may incorporate any of the embodiments of the invention shown in FIGS. 1–4.
Figure 6:
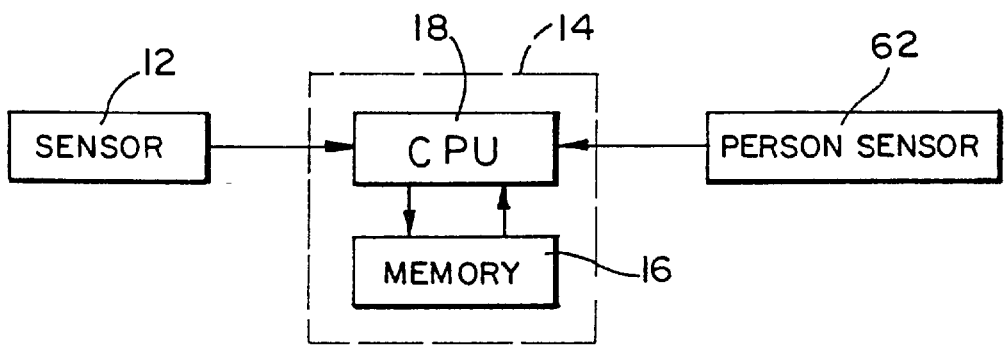
FIG. 6 is a second embodiment of the overall system depicted in FIG. 5.
Figure 7:
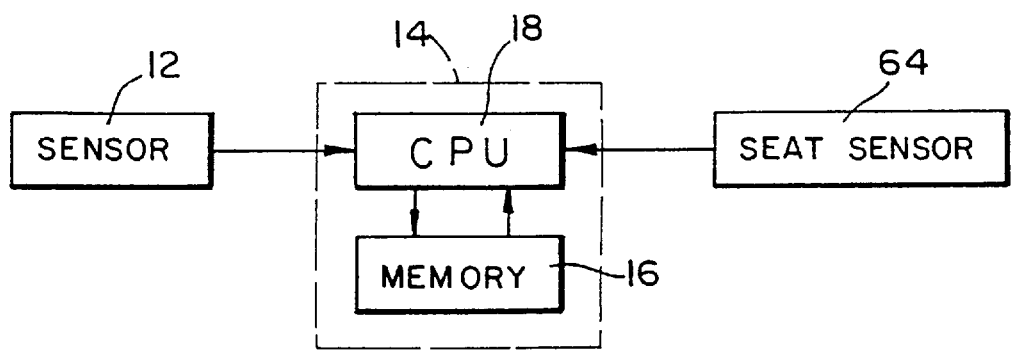
FIG. 7 is a schematic diagram depicting a third embodiment of the overall system shown in FIGS. 5 and 6.

FIGS. 5, 6 and 7 depict alternative embodiments of the overall system. To enable the control unit 14 to distinguish between information for individual users and aggregate information, it is necessary to monitor when each individual user enters and leaves the toilet stall or other, similar defined space. In the embodiment depicted in FIG. 5, a sensor 60 is provided on the door of the toilet stall to indicate to the CPU unit 18 of control unit 14 when the stall door is opened and when it is closed. By processing this information, control unit 14 can accurately determine when each user enters the stall and leaves the stall.

In the embodiment of the invention that is depicted in FIG. 6, a sensor 62 is provided to determine when a person is present in the toilet stall. Person sensor 62 could be a beam of light or sound that is broken by the person when he or she enters and leaves the stall. Alternately, the sensor could detect the person's presence when he or she sitting on the toilet.

In the embodiment of the invention shown in FIG. 7, a sensor 64 is provided beneath the seat of the toilet when an individual is sitting on the toilet. This will enable the control unit 14 to determine when an individual enters and leaves the area were he or she would be expected to use toilet tissue.

In operation, a user would enter the toilet stall area, and have his or her presence noted by the control unit 14 by one of the sensors 60, 62, or 64. As the individual uses toilet paper, the rotational displacement of the toilet roll is monitored and recorded by control unit 14. Control unit 14 may be programmed to calculate a number of different characteristics of toilet tissue use based on this information, including the total amount of tissue used by each individual, the duration of time over which the tissue is used, the number of discrete pulls on the toilet tissue taken by a user, and the amount of toilet tissue taken by a user per discrete pull. The products of such analysis may further be stored in the memory area 16 of control unit 14 for further analysis and/or retrieval. When the user leaves the stall area this is also recorded by one of the sensor 60, 62, 64. Throughout the entire process, the consumer will be unaware that his or her activity is being monitored, resulting in an undiminished feeling of privacy, and accuracy of the data that is recorded.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A system for collecting data on toilet tissue use at a particular location, comprising:
   sensing means for sensing one or more characteristics of toilet tissue use at a particular dispensing location; and
   recording means, in communication with said sensing means, for receiving and recording data from said sensing means for monitoring spent toilet tissue at the dispensing location.

2. A system according to claim 1, wherein said sensing means is for sensing quantitative characteristics of toilet tissue use.

3. A system according to claim 2, wherein said sensing means is for sensing the amount of toilet tissue that is used.

4. A system according to claim 1, further comprising analyzing means for analyzing information received from said sensing means.

5. A system according to claim 4, wherein said analyzing means is further for calculating a total amount of tissue used.

6. A system according to claim 1, wherein said sensing means comprises a member that is mounted to rotate with a roll of toilet tissue, and movement detecting means for sensing movement of said member when a user rotates the roll of tissue by pulling on a free end of the tissue.

7. A system according to claim 6, wherein said movement detecting means is constructed and arranged to sense movement of said member in increments that are less than one full rotation of the member.

8. A system according to claim 6, wherein said movement detecting means comprises a mechanical switch that is constructed and arranged to be contacted by said member.

9. A system according to claim 6, wherein said movement detecting means comprises a magnetic sensing means for detecting movement of said member.

10. A system according to claim 1, further comprising means for determining when an individual enters and leaves an area in which said system is installed, whereby information can be recorded on a user by user basis.

11. A system according to claim 10, wherein said determining means comprises a sensor for determining whether a stall door is in an opened or closed position.

12. A system according to claim 10, wherein said determining means comprises a sensor for determining whether or not an individual is sitting on a toilet seat.

13. A system according to claim 10 wherein said determining means comprises a sensor for determining whether a person is present in a closed area such as a toilet stall.

14. A system according to claim 1, wherein said sensing means and said recording means are configured and positioned so as to be substantially undetectable to a user, whereby accurate, untainted data can be obtained.

15. A system for analyzing individual and aggregate usage of toilet tissue use at a particular toilet stall, comprising:

determining means for determining whether a person is present in a toilet stall; sensing means for sensing one or more characteristics of toilet tissue use at the toilet stall;

analyzing means for analyzing data that is supplied by said sensing means; and recording means for recording data from at least one of said sensing means and said analyzing means, whereby toilet tissue use at the toilet stall can be accurately monitored and studied.

16. A system according to claim 15, wherein said analyzing means is further for calculating a total amount of tissue used.

17. A system according to claim 15, wherein said sensing means comprises a member that is mounted to rotate with a roll of toilet tissue, and movement detecting means for sensing movement of said member when a user rotates the roll of tissue by pulling on a free end of the tissue.

18. A system according to claim 17, wherein said movement detecting means is constructed and arranged to sense movement of said member in increments that are less than one full rotation of the member.

19. A system according to claim 17, wherein said movement detecting means comprises a mechanical switch that is constructed and arranged to be contacted by said member.

20. A system according to claim 17, wherein said movement detecting means comprises a magnetic sensing means for detecting movement of said member.

21. A system according to claim 15, wherein said determining means comprises a sensor for determining whether a stall door is in an opened or closed position.

22. A system according to claim 15, wherein said determining means comprises a sensor for determining whether or not an individual is sitting on a toilet seat.

23. A system according to claim 15, wherein said determining means comprises a sensor for determining whether a person is present in a closed area such as a toilet stall.

24. A system for collecting data on the use of a roll form absorbent commercial paper product at a particular location, comprising:

sensing means for sensing one or more characteristics of paper use at a particular dispensing location; and recording means, in communication with said sensing means, for receiving and recording data from said sensing means for monitoring spent paper at the dispensing location.

25. A system according to claim 24, further comprising analyzing means for analyzing information received from said sensing means.

26. A system according to claim 25, wherein said analyzing means is further for calculating a total amount of paper used.

27. A system according to claim 24, wherein said sensing means comprises a member that is mounted to rotate with a roll of paper, and movement detecting means for sensing movement of said member when a user rotates the roll of paper by pulling on a free end of the paper.

28. A system according to claim 27, wherein said movement detecting means is constructed and arranged to sense movement of said member in increments that are less than one full rotation of the member.

29. A system according to claim 27, wherein said movement detecting means comprises a mechanical switch that is constructed and arranged to be contacted by said member.

30. A system according to claim 27, wherein said movement detecting means comprises a magnetic sensing means for detecting movement of said member.

31. A system according to claim 24, further comprising means for determining when an individual enters and leaves an area in which said system is installed, whereby information can be recorded on a user by user basis.

32. A system according to claim 24, wherein said sensing means and said recording means are configured and positioned so as to be substantially undetectable to a user, whereby accurate, untainted data can be obtained.

33. A method for collecting data relevant to an individuals use of an absorbent roll type-paper product in a communal area, comprising steps of:

(a) determining when a person enters an area that is adjacent to a paper product dispenser;

(b) monitoring the person's use of the paper product in such a manner that the person is not aware of such monitoring; and (c) recording data obtained from said monitoring.

34. A method according to claim 33, further comprising the step of analyzing the data obtained in step (b).

35. A method according to claim 34, wherein said analyzing step comprises calculating a total amount of paper used.

36. A dispenser apparatus for dispensing roll form paper product to be used at a particular location, comprising:

a dispenser housing;

an axial element rotatably supported by said housing and adapted to maintain the roll form paper product for dispensation thereof;

sensing means, operatively associated with said axial element, for sensing one or more characteristics of paper use at the particular location; and recording means, in communication with said sensing means, for receiving and recording data from said sensing means, whereby paper use at the particular location can be monitored and studied.

37. An apparatus according to claim 36, wherein the roll form paper product includes a tubular core of predetermined dimensions and said axial element is configured having a tubular spindle received in the tubular core.

38. An apparatus according to claim 37, wherein said spindle is configured to frictionally engage an inner surface of the tubular core.

39. An apparatus according to claim 37, wherein said axial element includes a plate mounted thereon having at least one pin member extending axially therefrom, said plate positioned to juxtapose the roll form paper product during use such that said pin extends therein.

40. An apparatus according to claim 36, wherein said housing defines a first compartment for receipt of the roll form paper product and a second compartment for containing said sensing means and said recording means.

41. An apparatus according to claim 36, further comprising analyzing means for analyzing information received from said sensing means.

42. An apparatus according to claim 36, wherein said analyzing means is further for calculating a total amount of paper use.

43. An apparatus according to claim 36, wherein said sensing means comprises a member that is mounted to rotate with the roll form paper product, and movement detecting means for sensing movement of said member when a user rotates the roll form paper product by pulling on a free end thereof.

44. An apparatus according to claim 43, wherein said member is coaxially mounted to said axial element for rotation therewith.

45. An apparatus according to claim 43, wherein said movement detecting means is constructed and arranged to sense movement of said member in increments that are less than one full rotation of said member.

46. An apparatus according to claim 43, wherein said movement detecting means comprises a mechanical switch that is constructed and arranged to be contacted by said member.

47. An apparatus according to claim 43, wherein said movement detecting means comprises a magnetic sensing means for detecting movement of said member.

48. An apparatus according to claim 36, further comprising means for determining when an individual enters and leaves an area in which said system is installed, whereby information can be recorded on a user by user basis.

49. An apparatus according to claim 48, wherein said determining means comprises a sensor for determining whether a stall door is in an open or closed position.

50. An apparatus according to claim 48, wherein said determining means comprises a sensor for determining whether or not an individual is sitting on a toilet seat.

51. An apparatus according to claim 48, wherein said determining means comprises a sensor for determining whether a person is present in a closed area such as a toilet stall.

52. An apparatus according to claim 36, wherein said sensing means and said recording means are configured and positioned so as to be substantially undetectable by a user, whereby accurate, untainted data can be obtained.

* * * * *